US007269573B1

(12) United States Patent
Bunn et al.

(10) Patent No.: US 7,269,573 B1
(45) Date of Patent: Sep. 11, 2007

(54) VIRTUAL-PRODUCT PRESENTATION SYSTEM

(75) Inventors: Eric A. Bunn, San Jose, CA (US); Neschae Xavier Fernando, San Jose, CA (US); Llavanya Fernando, San Jose, CA (US)

(73) Assignee: Symbol Technologies, Inc., Holtsville, NY (US)

( * ) Notice: Subject to any disclaimer, the term of this patent is extended or adjusted under 35 U.S.C. 154(b) by 1097 days.

(21) Appl. No.: 09/615,363

(22) Filed: Jul. 13, 2000

(51) Int. Cl.
*G06F 17/30* (2006.01)

(52) U.S. Cl. .......................... 705/27; 705/26
(58) Field of Classification Search .................. 705/26, 705/27
See application file for complete search history.

(56) References Cited

U.S. PATENT DOCUMENTS 5,010,763 A * 4/1991 Schneider .................... 73/117

(Continued)

FOREIGN PATENT DOCUMENTS

JP    2001194983 A * 7/2001

OTHER PUBLICATIONS

"Get A Whiff Of This: And Now, Cyberscent;" Times-Picayune; News Orleans LA; May 25, 2000.*

(Continued)

*Primary Examiner*—Mark Fadok
(74) *Attorney, Agent, or Firm*—Fay Kaplun & Marcin, LLP

(57) ABSTRACT

Apparatus and methods for virtually presenting a product for purchase by a consumer. The product has one of the following characteristics: vibrations, a mass, a texture, a smell and a temperature. A memory stores a representation of a characteristic of the product. The representation is retrieved on demand from a shopper, and the characteristic reproduced from the retrieved representation for the benefit of the shopper. At the appropriate point—say, after the shopper's buying the product—the retrieval of the product for the shopper may be initiated. The storing of the characteristic representation may involve storing the representation in a database accessible over an internet. The apparatus may include a memory containing a representation of an approximation of a characteristic of the product for purchase, the characteristic from a set of characteristics including vibrations, a mass, a texture, a smell, and a temperature. The apparatus may also include a simulation sub-system communicatively coupled to the memory and corresponding to the characteristic. That is to say, the sub-system is from a set of simulation sub-systems including a vibratory sub-system for simulating vibrations, a mass-simulation sub-system for simulating mass characteristics, a textural sub-system for simulating a texture, an olfactory sub-system for simulating a smell and a temperature-simulation sub-system for simulating a temperature. Finally, the apparatus may also include a sales sub-system for indicating a desire to purchase the product.

12 Claims, 11 Drawing Sheets

U.S. PATENT DOCUMENTS

| | | | | |
|---|---|---|---|---|
| 5,590,062 A * | 12/1996 | Nagamitsu et al. | ............ | 703/6 |
| 5,845,261 A * | 12/1998 | McAbian | ............ | 705/26 |
| 5,848,399 A * | 12/1998 | Burke | ............ | 705/27 |
| 5,930,769 A * | 7/1999 | Rose | ............ | 705/26 |
| 6,026,376 A * | 2/2000 | Kenney | ............ | 705/26 |
| 6,169,595 B1 * | 1/2001 | Manne | ............ | 352/85 |
| 6,170,014 B1 * | 1/2001 | Darago et al. | ............ | 709/229 |
| 6,336,891 B1 * | 1/2002 | Fedrigon et al. | ............ | 482/8 |
| 6,542,442 B2 * | 4/2003 | Kaslon | ............ | 369/2 |
| 6,658,464 B2 * | 12/2003 | Reisman | ............ | 705/26 |
| 6,785,667 B2 * | 8/2004 | Orbanes et al. | ............ | 707/1 |
| 6,831,678 B1 * | 12/2004 | Travis | ............ | 348/46 |
| 6,945,457 B1 * | 9/2005 | Barcelou | ............ | 235/380 |
| 2002/0165912 A1 * | 11/2002 | Wenocur et al. | ............ | 709/203 |

OTHER PUBLICATIONS

Associated Press, "Wondow shopping beyound the glass a new device projects a three-dimensional image—sucha as a woman modeling jeans—into midair.", Orlando Sentinal, dated Nov. 5, 1994.*

* cited by examiner

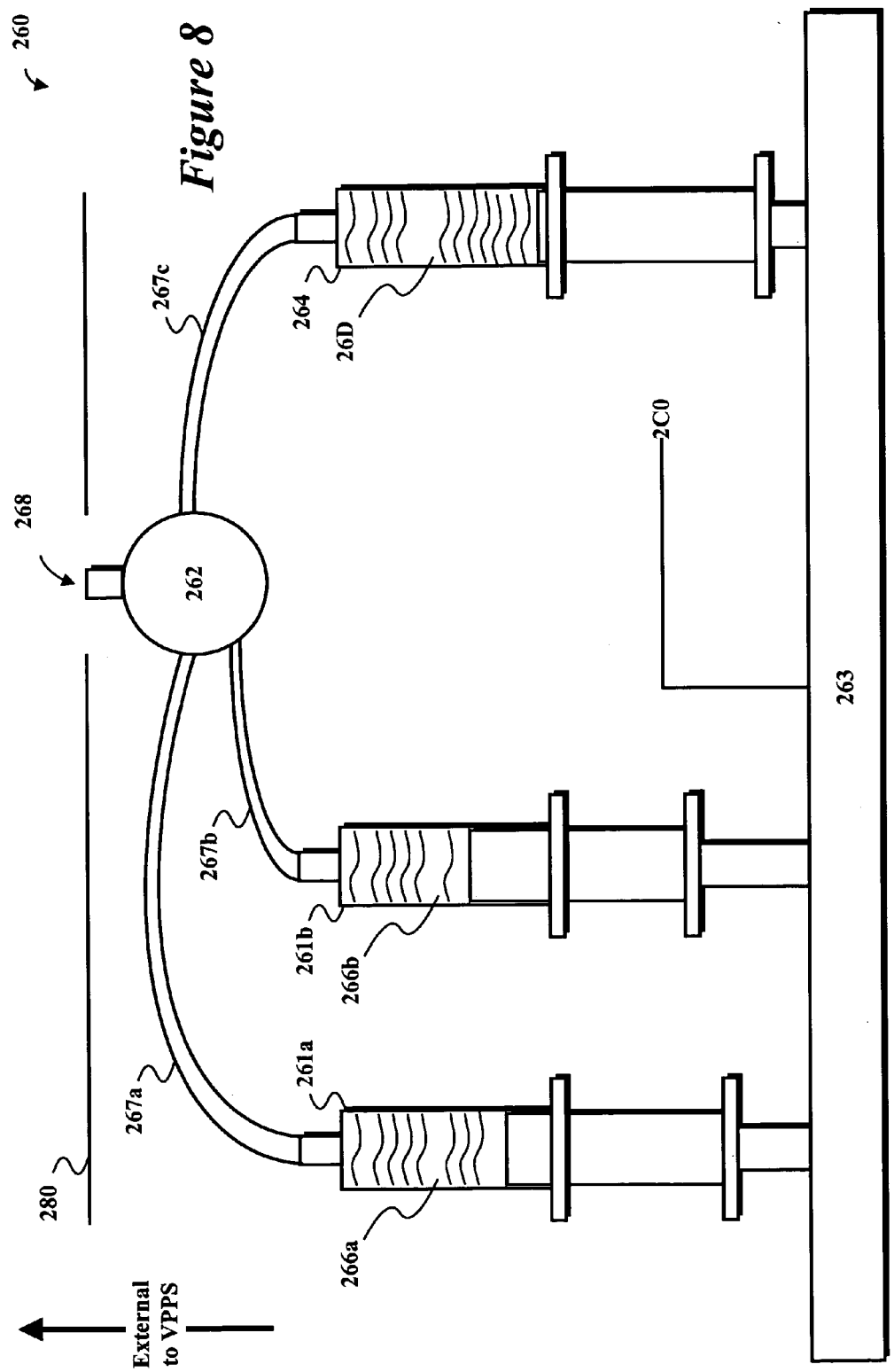

VIRTUAL-PRODUCT PRESENTATION SYSTEM

This invention relates to point-of-sale kiosks and other product-sales aides. More specifically, this invention relates to the generation of a virtual product for inspection by a potential buyer of that product.

BACKGROUND

In a typical shopping experience, the shopper walks into a merchant's store, decides which department or area of the store he wants to (begin to) shop in and proceeds to that department or area. Once in the desired department or area, the shopper wanders down various aisles or saunters past various display cases, glancing at the merchant's wares to narrow down the search area for the desired product.

Once in the correct department or area and in the correct sub-department or sub-area, the shopper picks up first one example and then another of the desired product, attempting to locate the one that best fits his criteria. Where the desired product is a camera, for example, these criteria can include brand, features, weight, cost, appearance, etc.

Of course, a salesperson may offer his services to the shopper, particularly with respect to criteria which are not readily obvious on initial inspection.

After selecting the exact example of the desired product that he wishes to buy, the shopper so informs the salesperson or a stock agent (where the stock is not immediately accessible to the shopper). The salesperson or stock agent retrieves an example for the shopper to purchase and to carry home or have delivered.

The shopper's satisfaction with such a shopping experience depends on a number of factors: the ease of finding the correct department or area, the ease of finding the correct sub-department or sub-area, the breadth and depth of the merchant's products on display, the extent to which the merchant's products on display correctly represent the merchant's stock on hand, the availability of information about particular instances of the merchant's products on display, etc. The salesperson, who presence is not an unmitigated blessing, can also affect the shopper's shopping experience. Each of the following salesperson attributes can affect the customer's satisfaction: availability, memory for detail, expertise, truthfulness, etc.

These factors and attributes are each described briefly below: Some merchants' stores have many departments, spread out over multiple floors or over areas as large as one square city block—or both. Without the aide of a greeter and even with the aide of a store directory, a shopper can feel overwhelmed at the prospect of searching such a vast space for the right department or area.

Even having located the right department or area, the shopper may still have to wander an entire floor, several long aisles, many short aisles or a minor maze of display cases.

One way to limit these initial searches is to limit the number of different products in the store. However, shoppers like selection and tend to reward merchants with the greater breadth and/or depth. In response, the merchant increases his displays. Nonetheless, the space available to a merchant is not unlimited, and its choice of products to display must also be limited, regardless of the shoppers' desire for more.

A shopper can be extremely frustrated when he has gone through the bother of locating the right department and sub-department and of selecting the right product from the multiple examples on display, only then to learn that the selected product is not in stock. Accordingly, some importance lies in offering for sale only products which can be sold, that is, which are in stock. At the least, a shopper should be told before he invests time in inspecting a product that that product is not in stock.

A stumbling block on the road to a shopper's walking out with a purchase is providing that shopper with enough information to make him confident enough to buy. Where a shopper is interested in, say, the dot pitch of a laptop screen but the marketing literature on display for the product does not include information about the dot pitch, the shopper's desire to buy that product expectedly wanes.

One way to improve the information available to a shopper is to enlist the aide of a salesperson. People, and in particular, good, well informed salespeople, are very adept at presenting the particular information a shopper wants in order to spur the buying of a product. The first hurdle to fully realizing a sales staff is the "Never a Salesperson Around When You Need One" concept. A shopper can get information from a well informed salesperson only if the salesperson is actually available. Further, a well informed salesperson has a limit to the amount of product detail he can retain and recall on demand. Computer-screen dot pitch, for example, is a feature about which the digerati would ask but about which the typical shopper would not even know.

Indeed, in some cases, a shopper is faced with a salesperson who appears to know less about the product of interest than the shopper does. Let alone knowing product details on the boundary between informative and esoteric, a salesperson can fail to be an expert at all.

Where a shopper's inquiries bottom out on the (lack of) depth of the salesperson's knowledge, the salesperson is faced with conflicting interests. Does he maintain his integrity, admit his lack of knowledge add possibly lose the sale or does he manufacture answers to the shopper's questions, independent of the truth, and persevere to close the sale? The latter option may be successful in the short term, but when the shopper tests his newly purchased product against the salesperson's promises, the merchant can expect a dissatisfied shopper returning the product and demanding a refund.

Salesperson or no, sometimes a product is considered too expensive or fragile for a shopper to experience hands on before purchase.

Accordingly, a new method of presenting a product for sale to a shopper is desirable where:
- a shopper does not have to invest time or energy in determining the right department and sub-department or area and sub-area,
- the merchant can display an essentially unlimited number of types of products and examples of product types,
- a merchant does not present for sale an item which the merchant does not have in stock or, at least, informs a shopper early in the shopping experience that the item is not in stock,
- a merchant can present to the shopper all marketing and technical information about the product and/or
- marketing and official technical information about any product is always available to the shopper.

DalmerChrysler Corp. of Detroit, Mich. has manufactured a kiosk for displaying products. FIG. 1 is a sketch of this kiosk 100 according to the prior art. The kiosk 100 includes a touch screen 120, a cathode-ray tube display 110, a speaker system 130 and a printer 140. A housing 150 holds the components of the kiosk 100 together.

The speaker system 130 is stereophonic but with low-quality speakers.

In operation, a user approaches the kiosk 100 and, following directions on its display 110, uses the touch screen 120 to navigate its menu system to locate a product of interest. The kiosk 100 displays a limited-animation or non-animated sequence of pictures of the product—or even a single, static picture of the product. The audio information that the kiosk 100 offers is voice and/or music only.

Accordingly, an improved product presentation system is desirable where:

the visual display of the product is dynamic and/or the display of the product includes sensory information other than product appearance and human voice.

Indeed, in its fullest expression, such a product presentation system would include all sensory aspects of the product such that having the actual product present would be redundant. The product as presented is virtually real.

These and other goals of the invention will be readily apparent to one of ordinary skill in the art on reading the background above and the description below.

SUMMARY

Herein are described apparatus and methods for virtually presenting a product for purchase by a consumer. The product has one of the following characteristics: vibrations, a mass, a texture, a smell, and a temperature. A memory stores a representation of a characteristic of the product. The representation is retrieved on demand from a shopper, and the characteristic reproduced from the retrieved representation for the benefit of the shopper. At the appropriate point—say, after the shopper's buying the product—the retrieval of the product for the shopper may be initiated.

The storage of the characteristic representation may involve storage in a database accessible over an internet.

The apparatus may include a memory storing a representation of a characteristic of the product for purchase. The characteristic is from a set of characteristics including vibrations, a mass, a texture, a smell and a temperature. The apparatus may also include a simulation sub-system communicatively coupled to the memory and corresponding to the characteristic. That is to say, the sub-system is from a set of simulation sub-systems including a vibratory sub-system for simulating vibrations, a mass-simulation sub-system for simulating mass characteristics, a textural sub-system for simulating a texture, an olfactory sub-system for simulating a smell and a temperature-simulation sub-system for simulating a temperature. Finally, the apparatus may also include a sales sub-system for indicating a desire to purchase the product.

The memory may store a second representation of a second characteristics of the product for purchase, the second characteristic from the same set of characteristics. Then the apparatus also includes a second sub-system corresponding to the second characteristic, the second sub-system from also the same set of simulation sub-systems and also communicatively coupled to the memory.

The sales sub-system may be a purchase sub-system for purchasing the product.

An internet may couple the memory and the simulation sub-system.

In another embodiment, the apparatus for virtually presenting a product for purchase may include a memory storing three representations of a respective three characteristics of a product for purchase, the respective three characteristics from a characteristics set including an image, a sound, vibrations, a mass, a texture, a smell and a temperature. The apparatus may also include three sub-systems corresponding to the three characteristics. That is to say, the three sub-systems are from a set of simulation sub-systems including a visual sub-system for simulating images, an auditory sub-system for simulating sounds, a vibratory sub-system for simulating vibrations, a mass-simulation sub-system for simulating a mass, a textural sub-system for simulating a texture, an olfactory sub-system for simulating a smell and a temperature-simulation sub-system for simulating a temperature. The three simulation sub-systems are communicatively coupled to the memory.

The memory may store a fourth representation of a fourth characteristic of the product for purchase, the fourth characteristic from the same characteristics set. Then the apparatus also includes a fourth sub-system corresponding to the fourth characteristic, the fourth sub-system also from the same set of simulation sub-systems and also communicatively coupled to the memory.

An internet may couple the memory and the three simulation sub-systems.

In yet another embodiment, the apparatus for virtually presenting products for purchase may include the memory containing the three representations of a respective three characteristics of a product for purchase, the three sub-systems corresponding to the three characteristics (still communicatively coupled to the memory), an internet coupling the memory and the three simulation sub-systems and the purchase sub-system for purchasing the product.

BRIEF DESCRIPTION OF THE DRAWINGS

FIG. 7A illustrates a cross-sectional view of the sub-system 250 while FIG. 7B illustrates an external view of the same.

FIG. 8 illustrates one embodiment of the olfactory sub-system 260.

FIG. 13 is a side-on view of a rod-in-mass configuration composing the sub-system.

The drawings are not to scale.

DESCRIPTION OF THE INVENTION

Devices

A Virtual-Product Presentation System

Figure 1:
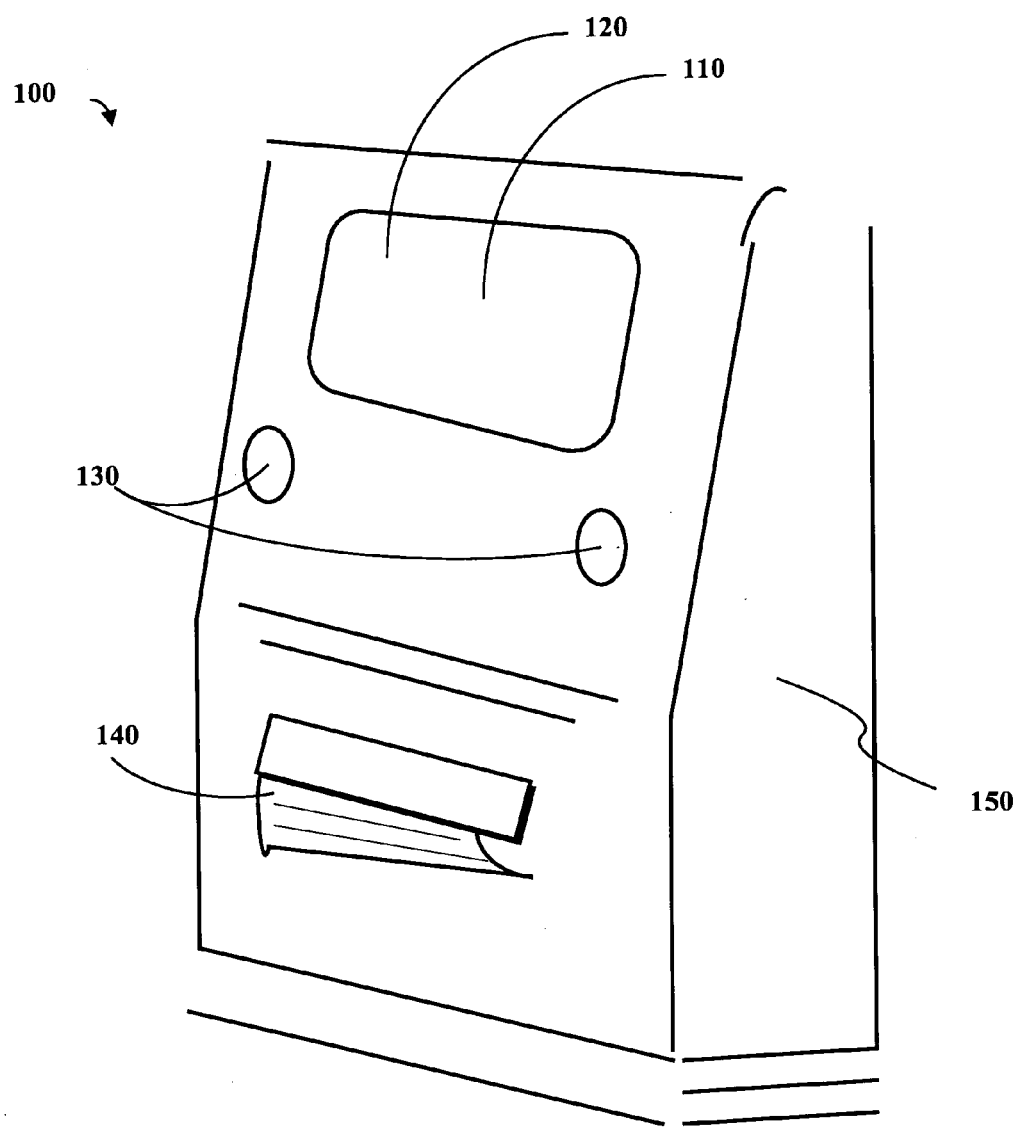
FIG. 1 is a sketch of a kiosk according to the prior art.
Figure 2:
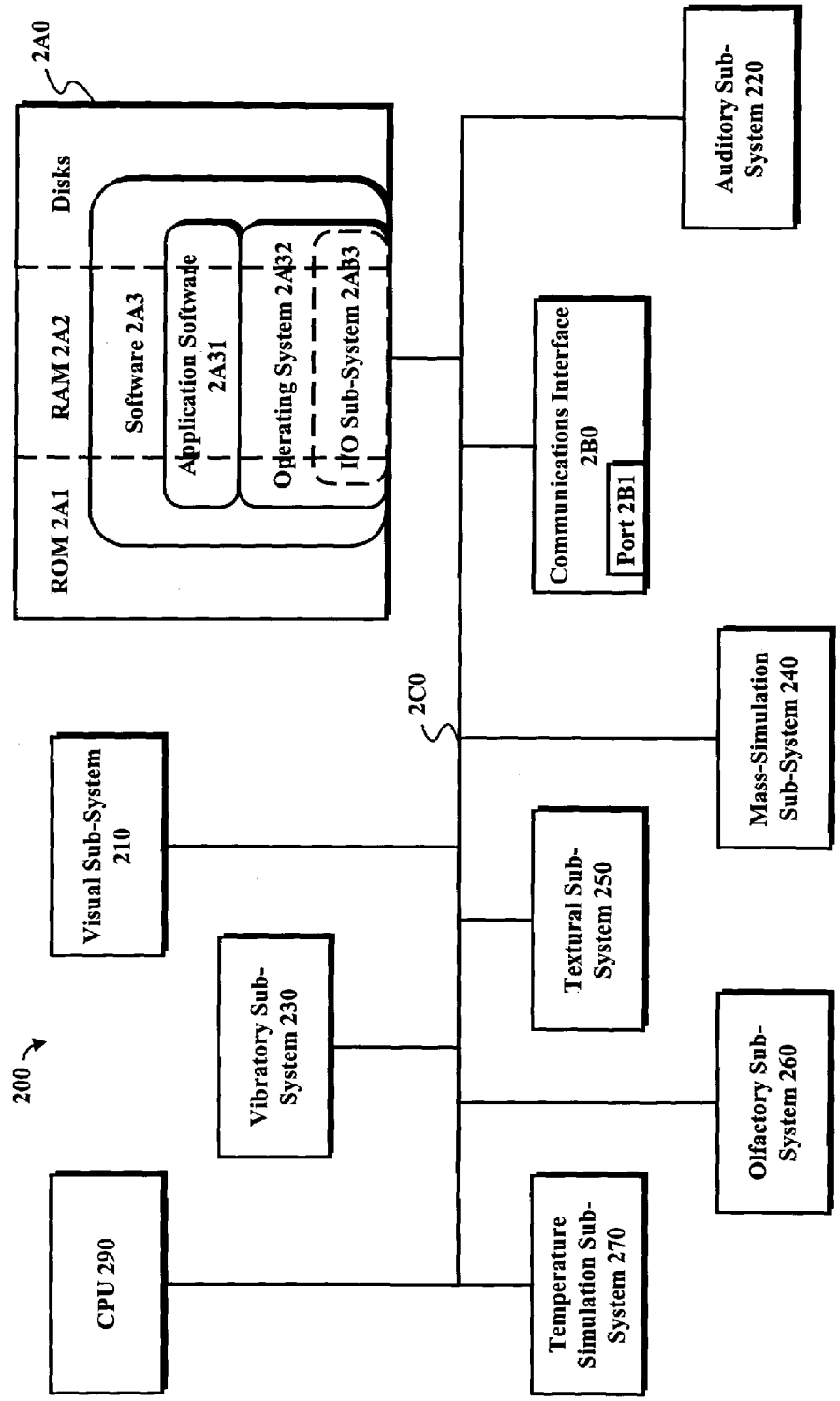
FIG. 2 is a diagram illustrating a virtual-product presentation system according to one embodiment of the invention.

FIG. 2 illustrates a virtual-product presentation system 200 according to one embodiment of the invention. The virtual-product presentation system (VPPS) 200 may include a central processing unit (CPU) 290, memory 2A0, a communications interface 2B0, a visual sub-system 210 for simulating images, an auditory sub-system 220 for simulating sounds, a vibratory sub-system 230 for simulating a vibrations, a mass-simulation sub-system 240 for simulating one or more characteristics of a mass (center of gravity, inertia, weight, etc.), a textural sub-system 250 for simulating a texture, an olfactory sub-system 260 for simulating a smell, a temperature-simulation sub-system 270 for simulating a temperature, a communications bus 2C0 and a housing 280 (not shown).

The housing 280 physically relates the sub-systems 210, 220, 230, 240, 250, 260, 270 to each other. The communications bus 2C0 communicatively couples each of the visual; auditory, vibratory, mass-simulation, textural, olfactory, temperature-simulation and communications sub-systems 210, 220, 230, 240, 250, 260, 270, 2B0 to the CPU 290 and to the memory 2A0, as well as couples the CPU 290 and memory 2A0 to each other.

The memory 2A0 includes high-speed, volatile random-access memory (RAM) 2A2, as well as non-volatile memory such as read-only memory (ROM) 2A1 and magnetic disk drives. Further, the memory 2A0 contains software 2A3. The software 2A3 is layered: Application software 2A31 communicates with the operating system 2A32, and the operating system 2A32 communicates with the I/O subsystem 2A33. The I/O subsystem 2A33 communicates with the sub-systems 210, 220, 230, 240, 250, 260, 270 and the communications interface 2B0 by means of the communications bus 2C0.

Figure 3:
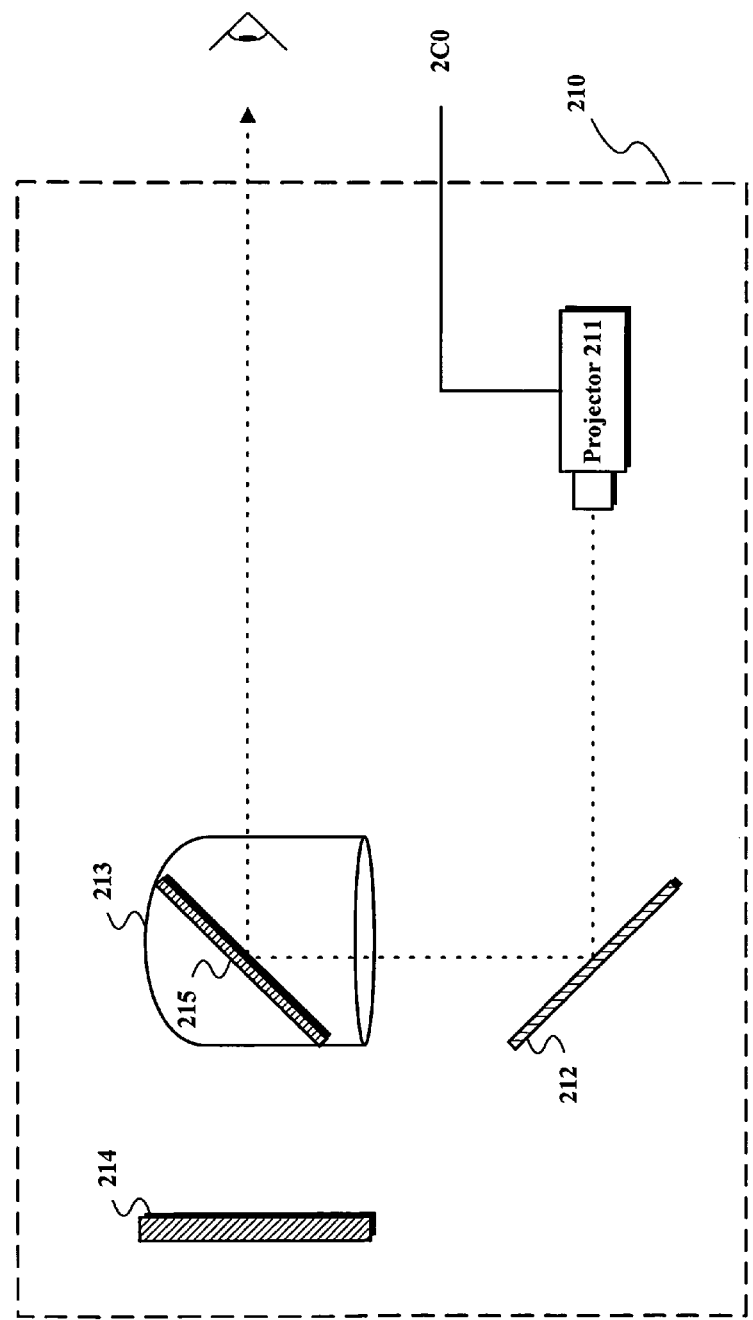
FIG. 3 illustrates one embodiment of the visual sub-system.

FIG. 3 illustrates one embodiment of the visual sub-system 210. In FIG. 3, the visual sub-system 210 includes an optical-image projector 211, a mirror 212, a dome 213, and a screen 215. The projector, mirror, dome and screen 211, 212, 213, 215 are optically coupled.

The optical-image projector 211 of the visual subsystem 210 may be a motion-picture projector, a cathode ray tube (CRT), a liquid crystal display (LCD) or the like.

The dome 213 defines a physical space for the projected image and helps the illusion that a physical object is inside. The visual sub-system 210 may include an optional background 214. This background 214 blocks out background distractions and creates the illusion that the image is an object inside the dome 213.

The screen 215 is a light-reflecting, non-mirror surface. The screens used in motion-picture or slide projection are examples. Additionally, the screen 215 may have fade-away edges and a color matching the background 214, both in order to avoid sharp contrast with the background 214. (In one embodiment, this color is black.)

Figure 4:
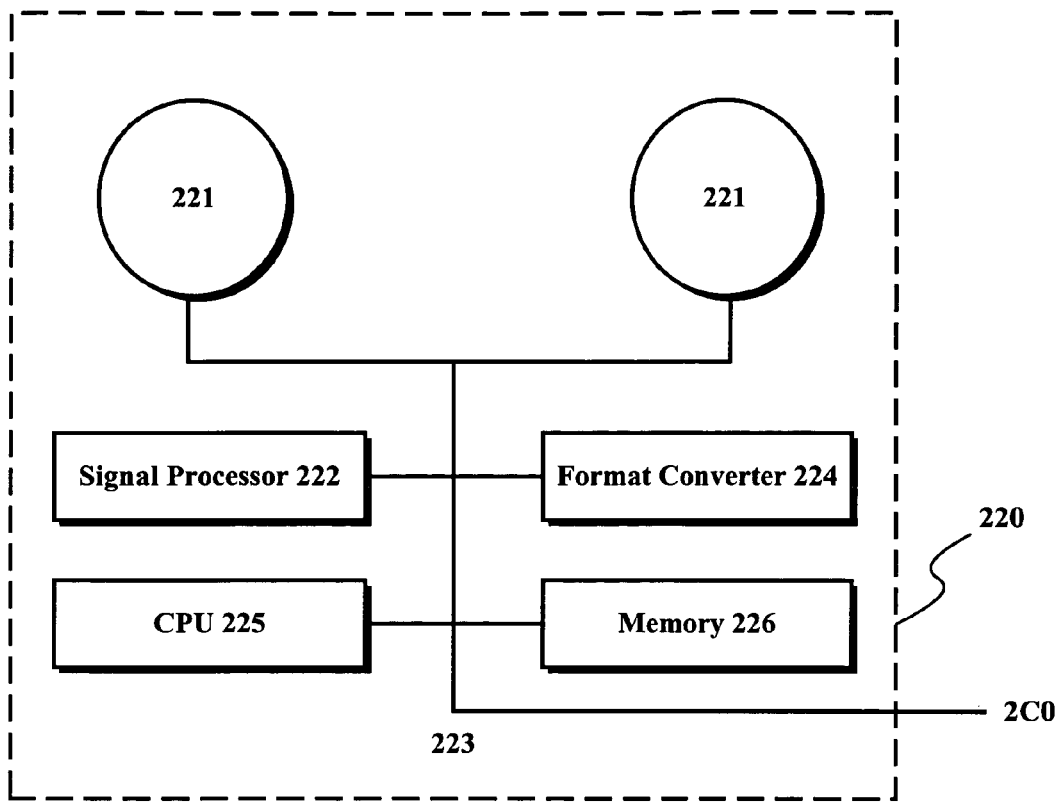
FIG. 4 illustrates one embodiment of the auditory sub-system.

FIG. 4 illustrates one embodiment of the auditory sub-system 220. In FIG. 4, the sub-system 220 includes high-quality stereophonic speakers 221, a signal processor 222 and a communications bus 223. The bus 223 may be fully or partially integral with the communications bus 2C0.

The signal processor 222 includes a digital-to-analog (D/A) converter.

In FIG. 4, the sub-system 220 includes stereophonic speakers, although a monophonic presentation is possible, as is an N-channel presentation, where N>2. For example, six-channel speaker systems are commonly used to re-create a movie-theater experience outside of such a theater.

Also, the speakers 221 are described as high quality. Lower-quality speakers are, of course, possible (but would limit the representation of certain products—top-quality speakers, for example).

Figure 5:
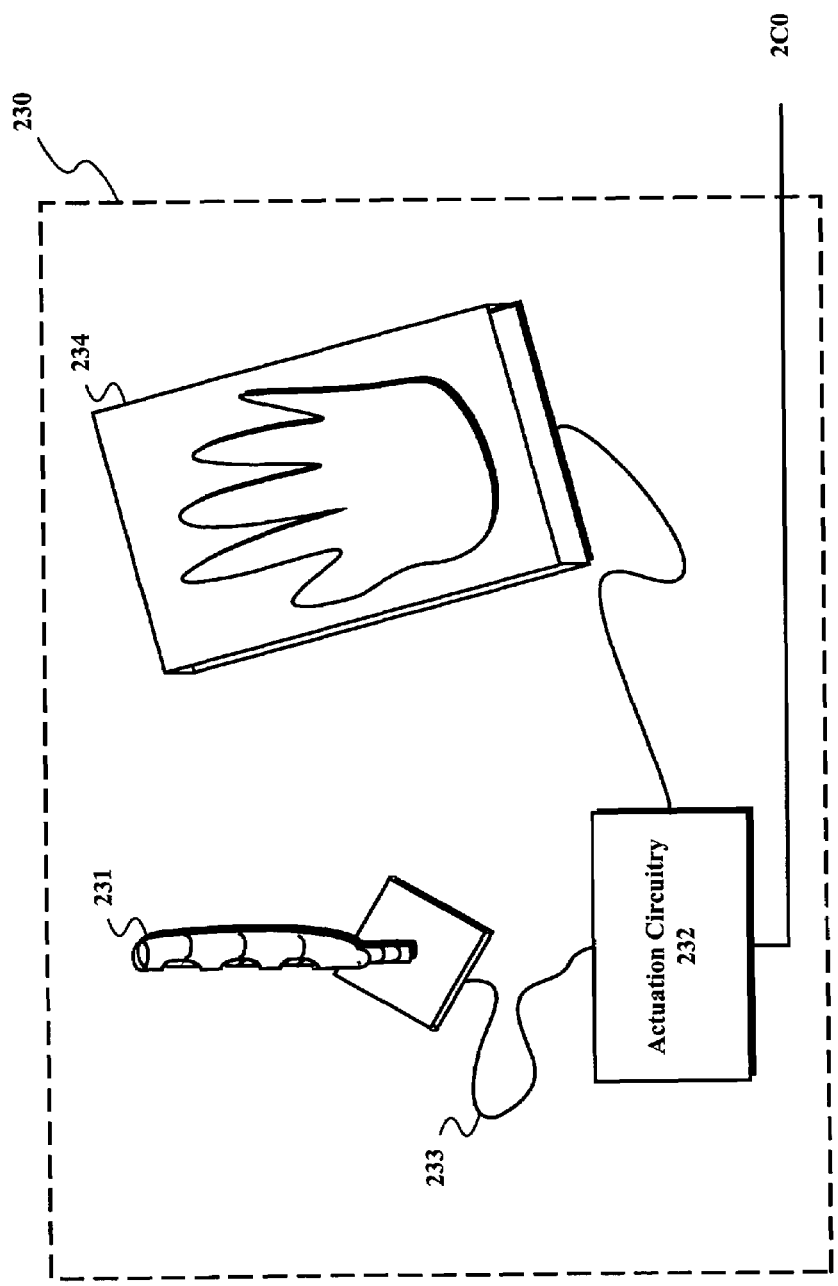
FIG. 5 illustrates one embodiment of the vibratory sub-system 230.

FIG. 5 illustrates one embodiment of the vibratory sub-system 230. In FIG. 5, the vibratory sub-system 230 includes a rest, mold or mount 231, actuation system 232, and a cable 233 or other means for communicatively connecting the actuation system 232 and the rest 231. The rest 231 may be a joystick, a grip ring, a hand mold or other means for transmitting vibrations to a hand in physical contact with the mount 231. The bus 2C0 connects to the actuation system 232 to permit external control of the sub-system 230.

The sub-system 230 optionally includes other rests or mounts 234 for transmitting vibrations to (an)other part(s) of the human body, including a rest for a second hand, a seat for buttocks or a rest for a foot. Indeed, the rest 231 itself need not be for a hand but may be for another body part as well.

The mass-simulation sub-system 240 simulates characteristics of a mass in a gravity field (typically, Earth's gravity field at sea level). Simulated characteristics may include center of gravity, inertia and weight.

Figure 6:
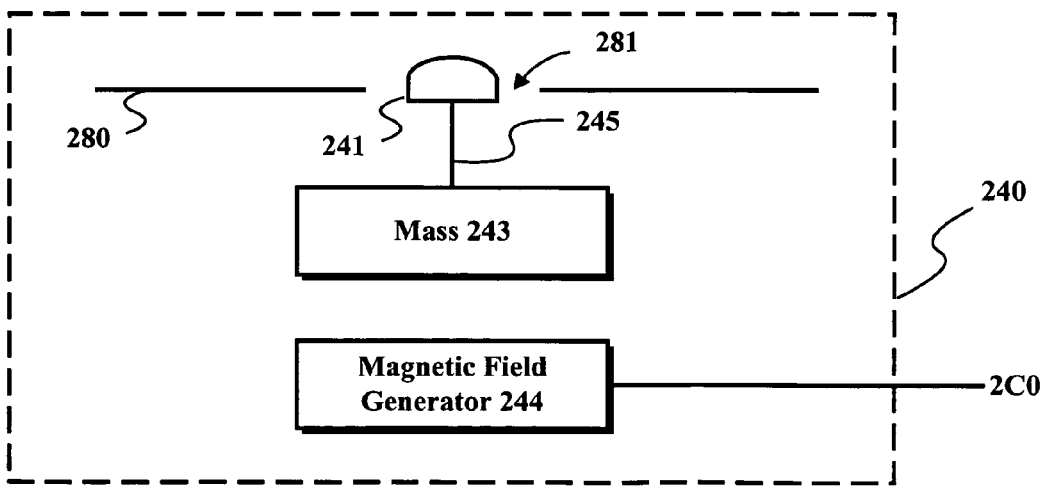
FIG. 6 illustrates one embodiment of the mass-simulation sub-system 240.

FIG. 6 illustrates one embodiment of the mass-simulation sub-system 240. In FIG. 6, the mass-simulation sub-system 240 includes a handle(s) 241, a magnetic mass 243, a magnetic-field generator 244 and a cable 245. The cable 245 mechanically couples the handle(s) 241 to the magnetic mass 243. The magnetic mass 243 is itself coupleable magnetically to the magnetic-field generator 244. The bus 2C0 connects to the generator 244 to permit external control of the sub-system 230.

(As used herein, the phrase "magnetic mass" refers to a collection of matter capable of being attracted by a magnet.)

Figure 7A:
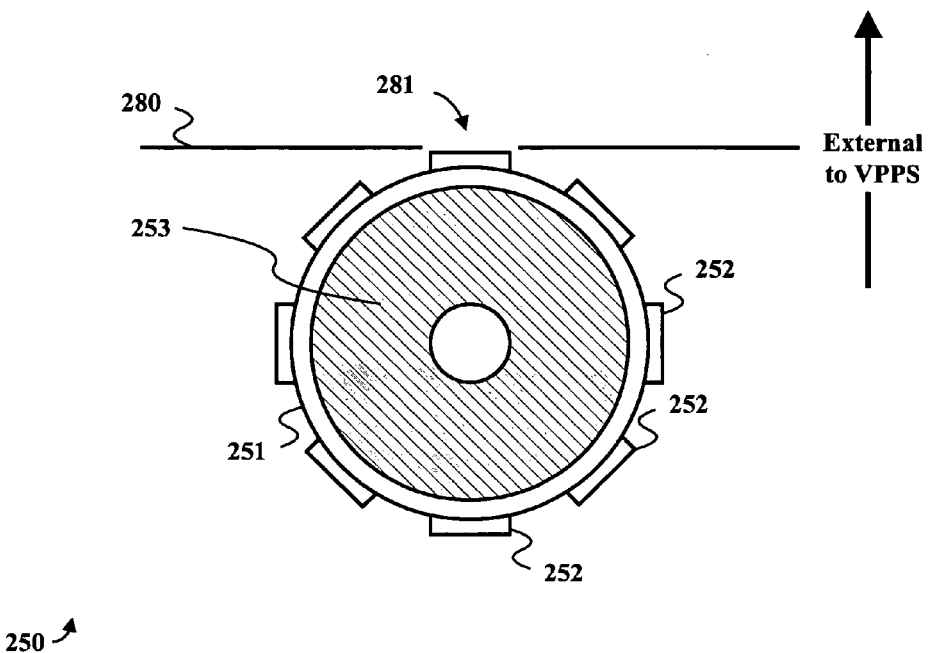
FIGS. 7A and 7B illustrate one embodiment of the textural sub-system 250.
Figure 7B:
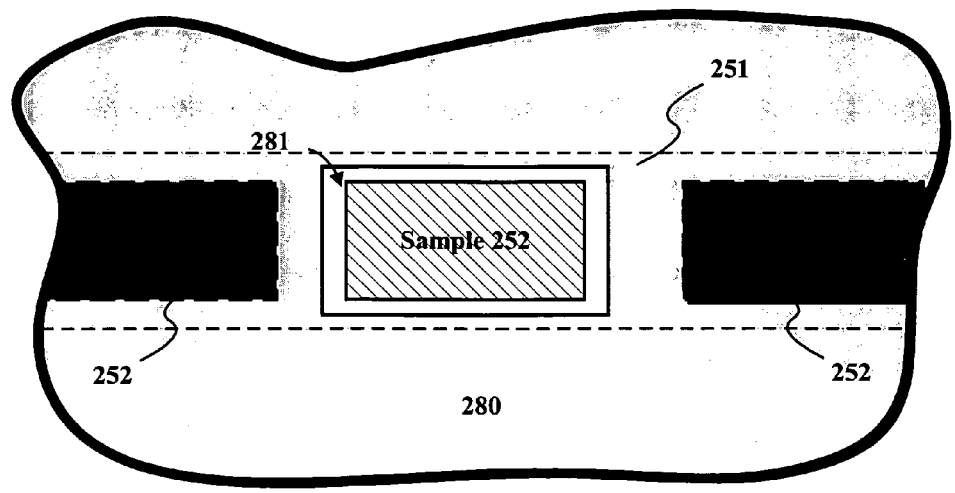

FIGS. 7A and 7B illustrate one embodiment of the textural sub-system 250. FIG. 7A illustrates a cross-sectional view of the sub-system 250 while FIG. 7B illustrates an external view of the same. The sub-system 250 may include a belt 251, multiple texture samples 252, a rotor 253, the housing 280, an opening 281 and the bus 2C0 (not shown). The multiple samples 252 are attached or integral to the belt 251, the belt itself mechanically coupled to the rotor 253. The housing 280 substantially covers the samples 252 except for an opening 281 exposing a single sample 252. The bus 2C0 connects to the rotor 253 to permit external control of the textural sub-system 250.

FIG. 7B illustrates a top view of the sub-system 250.

Not shown in FIGS. 7A and 7B are optional hydraulic, pneumatic or the like pads supporting corresponding samples 252 (from the shopper's perspective). A supporting pad may vary the pressure with which it supports its sample 252 to more accurately represent the texture to be simulated.

FIG. 8 illustrates one embodiment of the olfactory sub-system 260. The olfactory sub-system 260 may include multiple non-specific olfaction sample containers 261, respective multiple non-specific olfaction samples 266, respective multiple channels 267, a mixer 262, an expresser 263 and the bus 2C0.

The expresser 263 is mechanically coupled to the sample containers 261 and the mixer 262. The samples 266 reside in respective containers 261 that connect to respective channels 267. The channels 267 also connect to the mixer 262. The mixer 262 includes an exit 268. The bus 2C0 connects to the expresser 263, permitting external control of the sub-system 260.

In operation, the bus 2C0 carries a signal to the expresser 263 to express a particular smell. The expresser 263 expresses some combination of quantities of the samples 266 from the containers 261 into the channels 267. The sample quantities travel along the channels 267 into the mixer 262.

The mixer 262 mixes the sample quantities, and the expresser 263 expresses the resulting mixed sample through the exit 268 in the expected general direction of a shopper. (The mixer 262 or the expresser 263 may atomize the mixed sample.)

In one embodiment, the non-specific olfaction samples 266 span all or a signification portion of the space of human olfaction. (In a preferred embodiment, where the human sense of smell can be said to separate any given olfactory input into N (not necessarily orthogonal) characteristics, then the sub-system 260 includes N non-specific olfaction samples 266 corresponding respectively to those N characteristics.)

The reference *Firms Are On Scent of New Technology: Internet Odors, Taste*, Wall Street Journal, May 1, 2000, at C25A, surveys scent technology. Such scent technologies are alternate embodiments of the olfaction sub-system 260. (The Wall Street Journal reference is incorporated herein by reference.)

Figure 9:
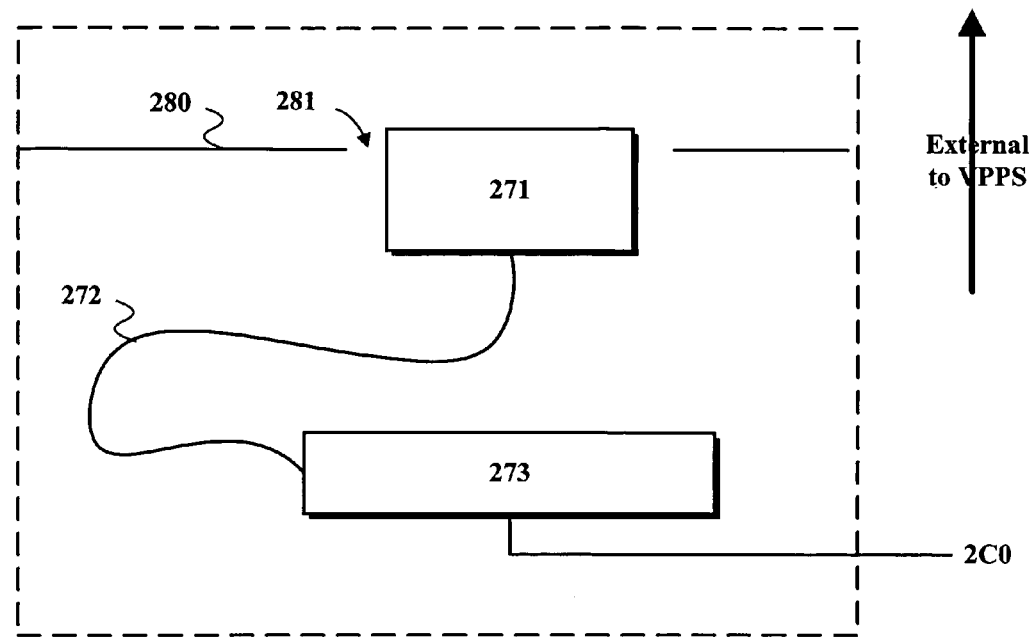
FIG. 9 illustrates one embodiment of the temperature-simulation sub-system 270.

FIG. 9 illustrates one embodiment of the temperature-simulation sub-system 270. The sub-system 270 includes a heating element 271, a cable 272, a thermostat 273 and the bus 2C0. The heating element 271 may radicate, conduct, convect or otherwise impart its heat to the intended target. The cable 272 communicatively couples the thermostat 273 and the heating element 271. The bus 2C0 connects to the thermostat 273, permitting external control of the sub-system 270.

Figure 15:
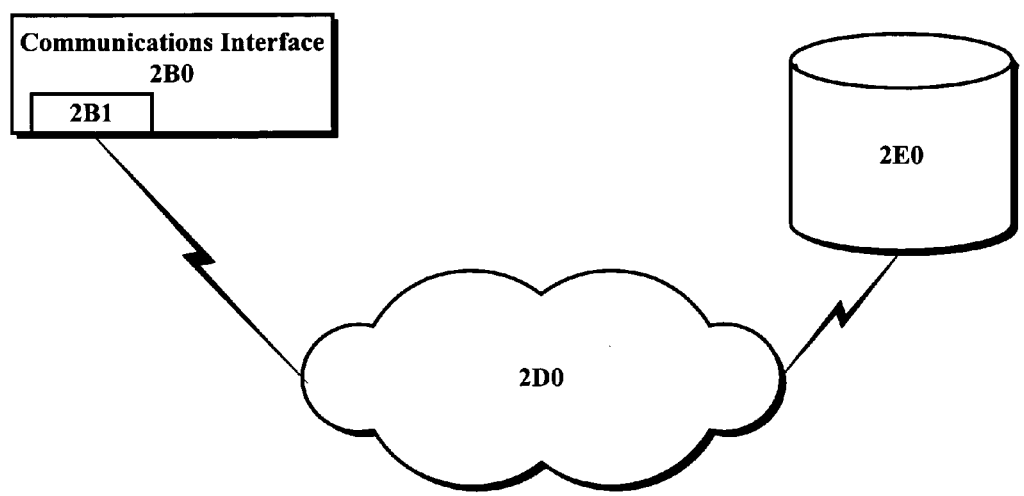
FIG. 15 illustrates a database accessible over a network via the communications interface.

Again regarding the VPPS system 220 of FIG. 2, the communications interface 2B0 may include a controller 2B1 for accessing a communications link 2D0. At least one database 2E0 of product information is accessible via the link 2D0. FIG. 15 illustrates the database 2E0 accessible over a network 2D0 via the communications interface 2B0.

For example, the storage requirements for multi-angle, high-resolution, three-dimensional images of a single product are notoriously high. Multiplying that storage requirement by hundreds or thousands of different products makes the storage requirements even more onerous.

By farming the storage requirements out to a database available over the communications link 2D0 (here, say, the internet), the invention allows multiple sites across the world to share the same database of images. This reduces to almost the point of elimination the local storage requirements for the kind of data stored in the internet database. Further, the economies of scale reduce the cost of maintaining the database over the communications link 2D0. Indeed, the database may reduce any product's representation to basic shapes that can be modified to represent the product with minimal cues from the database to the VPPS 200.

The communications sub-system 2B0 may also include devices for communicating with the shopper. For example, in some embodiments, the sub-system 2B0 includes some or all of the following devices common in computer systems: a monitor 2B2, a keyboard 2B3, a mouse 2B4, a touchscreen 2B5 overlying an LCD 2B6, a pen 2B7, a trackball 2B8.

The system 200 may include a point-of-sale (POS) subsystem 2F0 (not shown).

Figure 10:
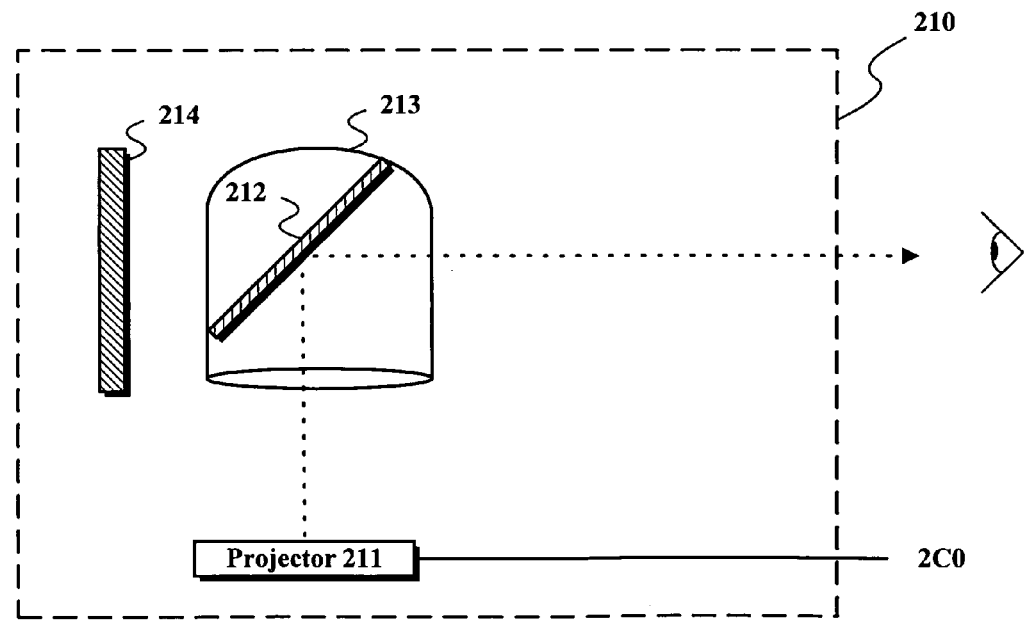
FIGS. 10 and 11 illustrate two alternate embodiments of the visual sub-system.
Figure 11:
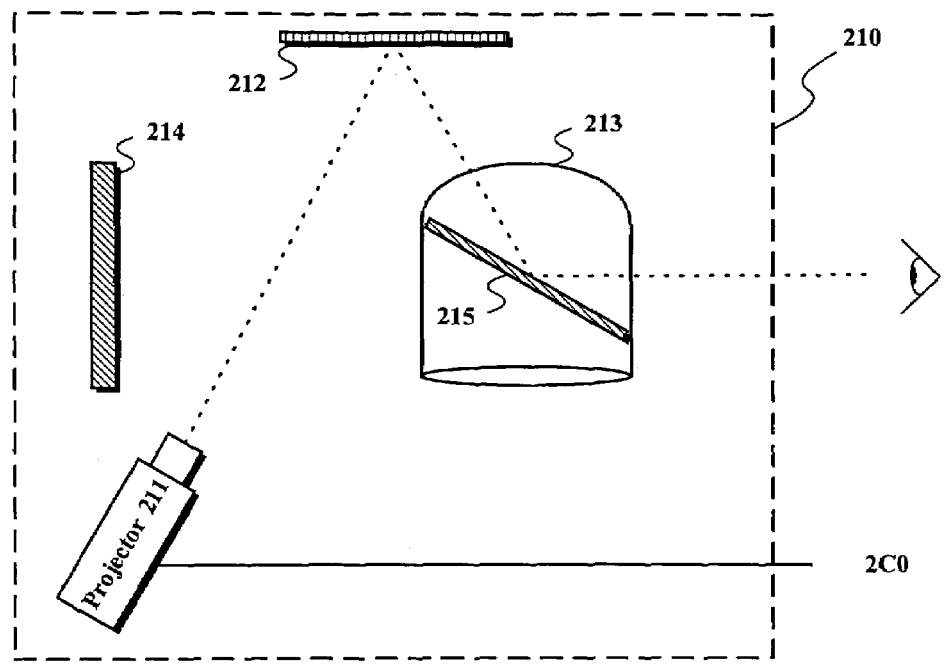

FIGS. 10 and 11 illustrate two alternate embodiments of the visual sub-system 210. In FIG. 10, the sub-system 210 includes the projector 211, the screen 215 and the dome 213. The projector, mirror and dome are still optically coupled but in a different configuration. Here, the projector 211 is horizontal (that is to say, parallel to the ground). A photon generated by the projector 211 travels vertically upward into the dome 213 and reflects off of the screen 215 into the line of sight of a viewer. A color-matched background 214 is positioned behind the screen 215.

In FIG. 11, the sub-system 210 includes the projector 211, the mirror 212, the dome 213 and the screen 215. The projector, mirror and dome are still optically coupled but in yet a different configuration. Here, the projector 211 is angled to project an image from behind and near the bottom or below the dome 213 onto the mirror 212 located above and closer to the dome 213. The mirror 212 is angled to reflect that image down onto the screen 215. The image reflects off of the screen 215 into the line of sight of a viewer.

An advantage of the embodiment of FIG. 11 is that the sub-system 210 requires less space vertically than the embodiments of FIGS. 3 and 11.

A format converter 224 is optional in the auditory sub-system 220. The sub-system 220 may also include a CPU 225 and memory 226 that allows the sub-system to operate initially under the direction of the kiosk CPU 290 but subsequently independently of that CPU 290.

One embodiment of the mass-simulation system 240 is a magnetic levitation-based haptic system reportedly under development at Carnegie Mellon University, Pittsburgh, Pa. The following articles describe that Carnegie Mellon haptic system: "Simulating Touch," Popular Science, June 1999, at 39; P. J. Berkelman and R. L. Hollis, "Interaction with Simulated Environments using a Magnetic Levitation Haptic Interface Device," IEEE International Conference on Robotics and Automation Video Proceedings, May 10-15, 1999 (a video) ("Berkelman I"); and P. J. Berkelman, R. L. Hollis, and D. Baraff, "Interaction with a Realtime Dynamic Environment Simulation using a Magnetic Levitation Haptic Interface Device," IEEE International Conference on Robotics and Automation, May 10-15, 1999, pp. 3261-3266 ("Berkelman II"). "Simulating Touch," Berkelman I and Berkelman II are incorporated by reference herein.

Figure 12:
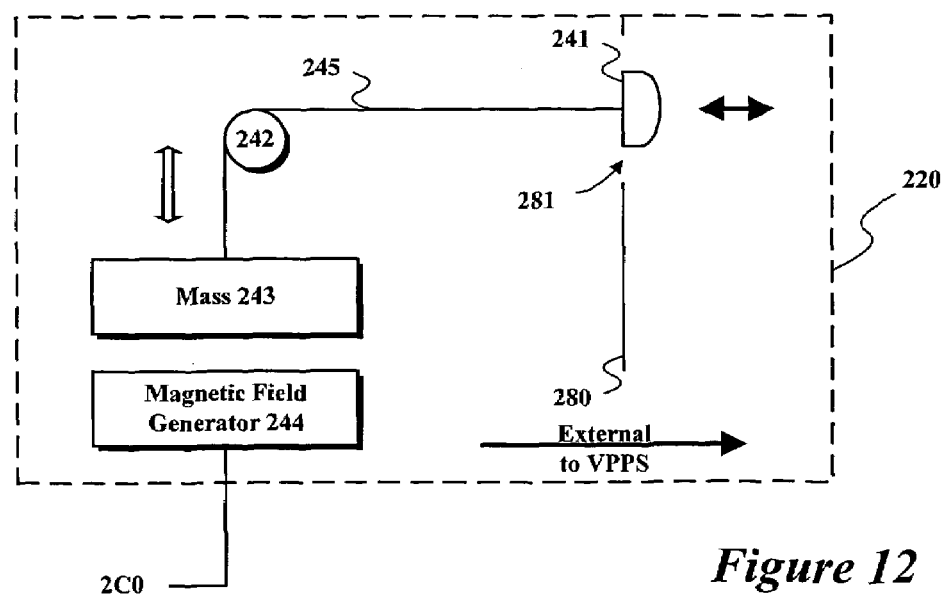
FIGS. 12 and 13 illustrate alternate embodiments of the mass-simulation sub-system.
Figure 13:
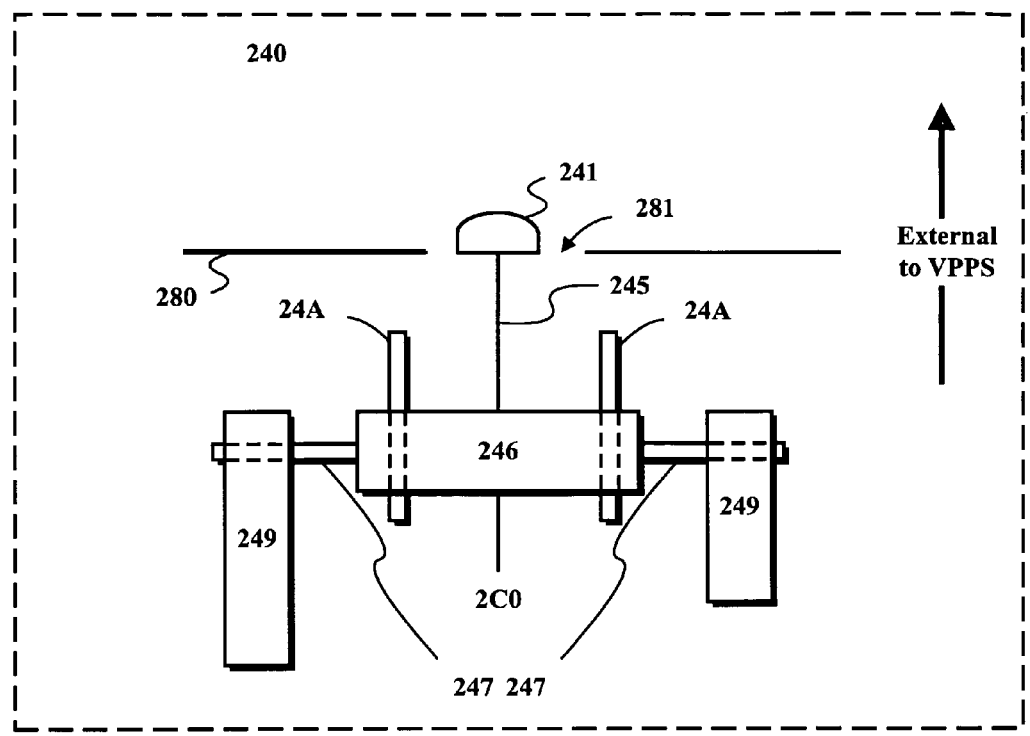

FIGS. 12 and 13 illustrate alternate embodiments of the mass-simulation sub-system 240. In FIG. 12, an optional pulley system 242 changes the direction of movement of the handle(s) 241 (indicated with solid, double-headed arrows) with respect to that of the magnetic mass 243 (indicated with blank double-headed arrows).

FIG. 13 is a side-on view of a rod-in-mass configuration composing the sub-system 240. The rod-in-mass configuration includes one or more handles 241, an actuator 246 including multiple rods 247, respective multiple masses 249 and a cable 245. The bus 2C0 attaches to the actuator 206 to allow external control of the sub-system 240.

The cable 245 connects the handles 241 to the actuator 246. Each of the rods 247 is capable of moving in order to connect or disconnect a respective mass 249 to the actuator 246. The actuator 246 moves the rods 247.

The rods 247 and the actuator 246 together effect a tunable mass 243. For example, if the maximum weight to be simulated is forty-eight (48) pounds, then the rods 247 weigh 1 pound, 2 pounds, 4 pounds, 8 pounds, 16 pounds and 32 pounds. With this combination of weighted rods, the sub-system 240 can simulate 1 through 48 pounds (actually, through 63 pounds) in 1-pound increments.

More generally, where the maximum desired weight to be simulated is N, then the rods 247 are of weights 1, 2, ..., $2^M$, where M is the $\log_2$ of N, rounded up to the next highest integer, if not an integer. Where a granularity other than one pound is desired, then the maximum desired weight is converted into units of the desired granularity, and the above process applied.

Figure 16:
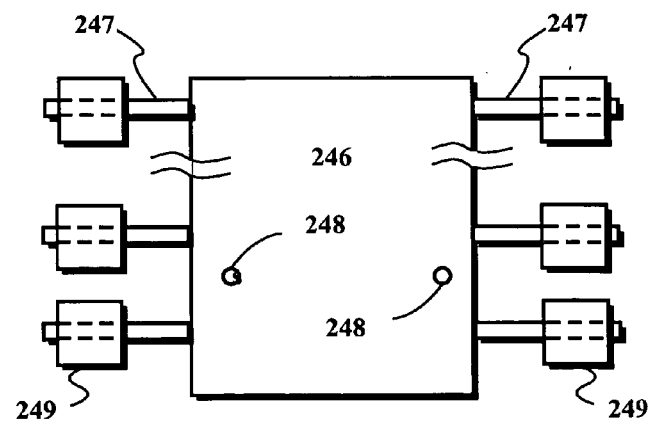
FIG. 16 is a top-down view of the rod-in-mass configuration of FIG. 13.

FIG. 16 is a top-down view of the rod-in-mass configuration of FIG. 13. In this view, optional races or runs 248 stabilize the configuration shown.

Where the multiple masses 249 are magnetic masses, then a mass-simulation sub-system 240 combining properties of the embodiments of FIGS. 6 and 13 is possible. For example, a sub-system 240 can use the masses 249 to approximate the mass to be simulated, while the field generator 244 tunes the mass approximation.

Figure 14:
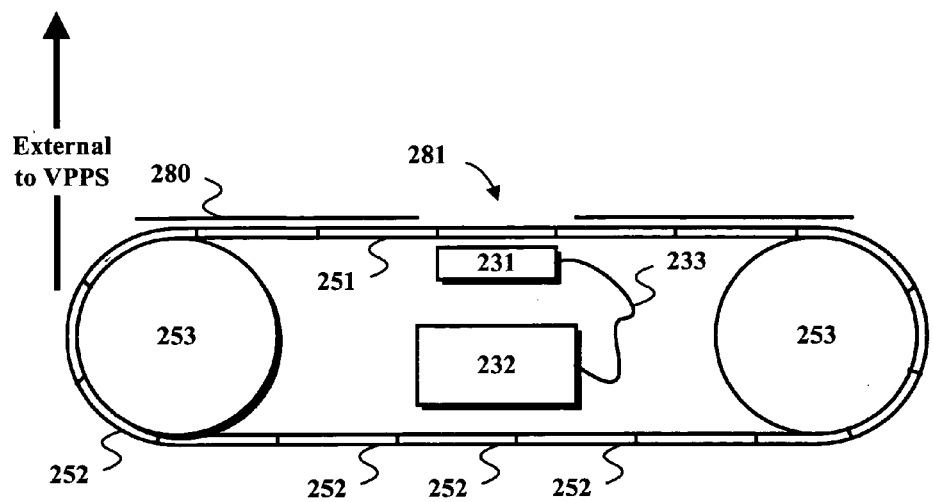
FIG. 14 illustrates an alternative embodiment of the textural sub-system.

FIG. 14 illustrates an alternative embodiment of the textural sub-system 250. As in FIG. 7A, the sub-system 250 includes the belt 251, multiple samples 252, housing 280 and opening 281. The sub-system 250 also includes the rotor 253—which may be differently configured to support this embodiment. The sub-system 250 also includes the rest, actuation circuitry and cable 231, 232, 233 of the vibratory sub-system 230. This embodiment combines the textural and mass-simulation sub-systems 250, 230.

In FIG. 8, the olfactory sub-system 260 optionally includes specific-source containers 264. Specific source containers 264 contain examples of specific, olfactorily complex products 26D that a shopper may wish to smell. Typically, these products 26D are so complex that the non-specific-source containers 261 would have difficulty reproducing them.

The sub-system 260 also optionally includes a de-expresser 265 for increasing the rate at which an expressed smell dissipates. In one embodiment, the de-expresser 265 is a fan. In another embodiment, the de-expresser 265 includes an air pulser 26A, a sampler 26, optional valves 26B and a feedback signal 26C. The pulser 26A and the sampler 269 connect to the mixer 262.

In operation, the pulser 26A pushes air through the mixer 262 in order to blow any residual mixed samples from the mixer 262. The sampler 269 samples the air exiting the mixer 262 to determine concentrations of the samples 261 in the air. The feedback signal communicates these determined concentrations to the pulser 26A (which may be a part of the expresser 263) that then determines whether the concentrations are sufficiently low to stop the pushed air. The optional valves 26B prevent any sample remaining in a channel 267 from contaminating the mixer 262 after the pulser 26A has cleaned it.

Protocols

The operation of the sub-systems of the VPPS 200 and of the VPPS 200 itself in one embodiment is further described below. The operation of the subsystems and the VPPS 200 with alternate embodiments will be evident to one of ordinary skill in the art:

The VPPS 200 initially presents a greeting and/or instructional screen on its LCD 2B6 instructing a shopper how to make the VPPS aware of his presence. Such a greeting screen(s) could, for example, include the phrases, "Hello! Please touch this screen to begin."

In response to a shopper's touching the screen 2B5, the VPPS 200 may present one or more additional greeting, instructional and/or advertisement screens.

The VPPS 200 presently presents on the LCD 2B6 a top-down series of menus for choosing departments, sub-departments and other lower-level departmental divisions as appropriate and instructs the shopper how to choose and/or invites the shopper to choose. (Herein, the concept of instructing a shopper how to do something means instructing the shopper how to do that thing and/or inviting the shopper to do that thing.)

In response to the shopper's indicating the departmental area of interest, the VPPS 200 presently lists the product categories available in that departmental area and instructs the shopper how to choose.

In response to the shopper's indicating the product category of interest, the VPPS 200 presently asks the shopper whether he wishes to browse or look at a specific known product.

In response to the shopper's indicating that he wishes to browse, the VPPS 200 may present browsing options. For example, the VPPS 200 may list two or more of the following or similar options: browse-all, browse-by-brand, browse-by-weight, browse-by-cost, and browse-by-color. The VPPS 200 can present a "browse-by-" option for each characteristic in its database of the product category.

In response to the shopper's indicating that he wishes to browse all of the product category, the VPPS 200 presently presents an abbreviated simulation of a first product from the category, followed by an abbreviated simulation of a next product, followed by another and so on. The abbreviated simulations may be still images, one per product.

In a preferred embodiment, while or after presenting an abbreviated simulation, the VPPS 200 instructs the shopper to select the next product. In response to the shopper's indicating his desire to move onto the next product, the VPPS 200 terminates the simulation and presents n abbreviated simulation of a next product—whether or not the abbreviated simulation has run its course. This is done until the category is exhausted.

In addition to instructing the shopper to select the next product to browse, the VPPS 200 instructs the shopper to indicate when he wishes to see a fuller simulation of the product currently but abbreviatedly simulated. In response to the shopper's indicating his wish to see a particular product more fully simulated, the VPPS 200 retrieves the characteristics of the selected product from a database (the database 2E0, for example) and activates the sub-systems 210 through 270 as indicated by the characteristic values retrieved.

The other browsing options are handled in a similar manner. (The ordering of the product presentation within a characteristic category may be a matter of marketing.)

In response to the shopper's indicating that he wishes to see a specific, known product, the VPPS 200 instructs the shopper to enter information sufficient to identify the product, typically the brand and model. After receiving and verifying the data entered, the VPPS 200 retrieves the characteristics of the identified product from a database and activates the sub-systems 210 through 270 as indicated by the characteristic values retrieved.

Where one of the selected or indicated product's characteristics is visual, the visual-characteristic value includes information sufficient to operate the visual sub-system 210. Accordingly, the CPU 290 drives the bus 2C0, instructing the projector 211 to emit one or more images (that the mirror and screen 212, 215 reflect) into the shopper's eye. These images approximate an image of the product. ("Approximation" includes exact reproduction.)

The projector may project multiple, discrete images. In a preferred embodiment, the images are three-dimensional reproductions of the product, two successive images are sufficiently similar and close together as to replicate the product's turning smoothly and continuously in space, and the shopper controls the viewpoint. To allow the user to control the viewpoint, the VPPS 200 coordinates the output the visual sub-system 210 and input from the user from, say, the trackball 2B8 of the communications sub-system 2B0, a handle 241 of the mass-simulation sub-system 240 or a mass-sensitive rim of the sub-system 240.

Where one of the selected or indicated product's characteristics is auditory, the auditory-characteristic value includes information sufficient to operate the auditory sub-system 220. Accordingly, the CPU 290 drives the bus 2C0, instructing the signal processor 222 to emit one or more sounds that the speakers 221 broadcast into the shopper's ears. These sounds approximate the sounds of the product.

Where one of the selected or indicated product's characteristics is vibratory, the vibratory-characteristic value includes information sufficient to operate the vibratory sub-system 230. Accordingly, the CPU 290 drives the bus 2C0, instructing the actuation circuitry 232 to vibrate a rest 231, 234 to approximate the vibrations of the product.

Where the sound of a product varies according to its vibrations, the VPPS 200 may coordinate the operation of the auditory and vibratory sub-systems 220, 230.

Where one of the selected or indicated product's characteristics is mass, the mass-characteristic value includes information sufficient to operate the mass-simulation sub-system 240. Accordingly, the CPU 290 drives the bus 2C0, in one embodiment instructing the generator 244 to generate an electromagnetic field that acts (in concert with the earth's gravitational field) on the mass 243 approximately as does the earth's gravitational field on the product.

Where one of the selected or indicated product's characteristics is textural, the textural-characteristic value includes information sufficient to operate the textural sub-system 250. Accordingly, the CPU 290 drives the bus 2C0, in one embodiment instructing the rotor 253 to turn the belt 251 to bring the appropriate sample 252 approximating a texture of the product to the opening 281 and to appropriately adjust back pressure.

Where one of the selected or indicated product's characteristics is olfactory, the olfactory-characteristic value includes information sufficient to operate the olfactory sub-system 260. Accordingly, the CPU 290 drives the bus 2C0, in one embodiment instructing the expresser 263 to express a certain amount (possibly none) of each of the samples 266, 26D (into the mixer 262) for ultimate expression via exit 268 towards the shopper. The combination of the certain amounts of all of the samples 266, 26D approximate a smell of the product.

Finally, where one of the selected or indicated product's characteristics is temperature, the temperature-characteristic value includes information sufficient to operate the temperature-simulation sub-system 270. Accordingly, the CPU 290 drives the bus 2C0, instructing the thermostat 273 to drive the heating unit 271 to temperatures approximating temperatures associated with the product.

While or after presenting a simulation of a product, the VPPS 200 instructs the shopper how to purchase the product.

Of course, some of the above steps may be collapsed, making the VPPS 200 presentation less logical but more user friendly.

Also, the VPPS 200 incorporates "pause," "go back" and "start over" options, as well as reasonable timeouts to account, for example, for the shopper walking away in mid-presentation.

The VPPS 200 coordinates simulations presentations through the sub-systems 210 through 270 as appropriate. Indeed, where particular sub-systems are not needed in the simulation of a product, the VPPS 200 may nonetheless use them to create ancillary sensations of the product, including ancillary sensations of the experience of using the product. For example, where the VPPS 200 is demonstrating the vibrations transmitted through a racket when hit in its sweet spot by a ball, the auditory sub-system 220 can present the sound of the ball hitting that sweet spot.

EXAMPLE

With the VPPS 200 in place, an example shopping experience can be more like the following: The shopper walks into a merchant's store and up to the VPPS 200. (The store may be a major department store such as Macy's or Sears.) In response to a greeting screen, the shopper touches the touchscreen to proceed.

Seeing a menu of departments, the shopper selects the department of the store he wants to start shopping in. Now, rather than proceeding to that department to narrow the search area for the desired product, the shopper further uses the touchscreen 2B5 and LCD 2B6 to walk the lower-level menus presented by the VPPS 200. Let's say the shopper is interested in kitchenwares, more specifically, kitchen appliances.

Having communicated to the VPPS 200 the correct department and sub-department, the shopper next selects the product category of interest. Let's say it is hand-held mixers.

Given the choice to browse or go directly to a known product, the shopper elects to browse, and when given more options, elects to browse by cost. The shopper then sees an image of a first hand-held mixer, along with some product information, including cost. Since this first hand-held mixer is clearly not what he wants, the shopper touches the next-product button. The shopper moves through several mixers in such a manner until he sees one in particular that he likes. This VPPS selection process simulates the shopper's picking up first one product sample and then another, attempting to find the one that best fits his criteria.

Touching the fuller-simulation button, the shopper sees the previously still image of the mixer begin to turn, giving him a full three-dimensional picture of what the mixer looks like. He also hears a voice explaining how he can experience the quietness (that is to say, hear the noise level) of the mixer at different speeds by touching the desired mixer speed button on the touchscreen. The voice also informs him that he can feel how little the mixer vibrates and how strong the torque is by gripping a handle.

The shopper selects a mixing speed, grips the handle and listens to the audio output. He acquires a much fuller sense of the mixer product than he would from just selecting from boxes on shelves or even from seeing samples side-by-side on a shelf.

As a sales aide, the VPPS 200 deploys the otherwise unused olfactory sub-system 260 to express, say, the aroma of baking bread or cookies.

Unclear whether the mixer's controls are easy-to-understand, the shopper uses the handle to turn the image to display the controls and instructs the VPPS 200 to pause and zoom the image. He thus gets a closer look at the controls.

Fairly convinced that this mixer is good, the shopper pulls on the handle to test the weight of the product. More convinced but still not firmly so, he touches a button for more product information. He reviews the store and manufacturer's sales and marketing information, as well as the specifications for the product. He is now firmly convinced.

The shopper inserts his payment card (credit, EFT, smart, etc.) into the point-of-sale terminal in the VPPS 200 and purchases the product. Receiving a receipt from the VPPS 200 and having been informed that delivery of the mixer to the shopper (that is to say, while he is at the VPPS 200) takes a minute or two, the shopper waits at the VPPS 200. He may possibly be distracted by store advertisements or other information from the VPPS 200 or may begin to use the VPPS 200 to shop for another product.

A sales agent or stock person delivers the mixer to the shopper.

Of course, a salesperson may offer his services to the shopper, particularly with respect to criteria which are not readily obvious on initial inspection.

The invention now being fully described, many changes and modifications that can be made thereto without departing from the spirit or scope of the appended claims will be apparent to one of ordinary skill in the art. The use of two mirrors rather than a combination of a mirror 212 and a screen 215 in the visual sub-systems of FIGS. 3 and 11 is still another example.

What is claimed is:

1. A system to present a virtual representation of at least one product for purchase by a user of the system, the system including:
    a processor unit;
    memory, coupled to said processor unit, storing an approximation of an image of said product;
    a visual sub-system, functionally coupled to said memory and defining a three-dimensional display area, that simulates said image for said user such that a three-dimensional visual representation of said product appears in said display area;
    a monitor, functionally coupled to said processor unit, to display for viewing by said user a selection including each said product; and
    a sales unit, coupled to said processor unit, enabling said user to purchase said product.

2. The system of claim 1, wherein said memory is network-coupled to said system.

3. The system of claim 1, wherein said memory is coupled to said system via an Internet link.

4. The system of claim 1, wherein simulation of at least one further characteristic for said product chosen from the group of characteristics consisting of: sound, texture, mass, smell, temperature, and vibration, is provided said user.

5. The system of claim 4, wherein simulation of at least two further characteristics for said product are provided said user.

6. A system according to claim 1, wherein said memory further stores an approximation of a sound of said product, said system further comprising a simulation subsystem functionally coupled to said memory that simulates said sound for said user.

7. A system according to claim 1, wherein said memory further stores an approximation of a texture of said product, said system further comprising a simulation subsystem functionally coupled to said memory that simulates said texture for said user.

8. A system according to claim 1, wherein said memory further stores an approximation of a smell of said product, said system further comprising a simulation subsystem functionally coupled to said memory that simulates said smell for said user.

9. A system according to claim 1, wherein said memory further stores an approximation of a mass of said product, said system further comprising a simulation subsystem functionally coupled to said memory that simulates said mass for said user.

10. A system according to claim 1, wherein said memory further stores an approximation of a temperature of said product, said system further comprising a simulation subsystem functionally coupled to said memory that simulates said temperature for said user.

11. A system according to claim 1, wherein said memory further stores an approximation of a vibration of said product, said system further comprising a simulation subsystem functionally coupled to said memory that simulates said vibration for said user.

12. A system according to claim 1, wherein said visual subsystem comprises a dome defining said three-dimensional display area.

* * * * *